March 22, 1966     D. S. HIRSCH     3,241,543
BURNER ARRANGEMENT FOR DOMESTIC COOKING OVEN
Filed April 28, 1964     2 Sheets-Sheet 1
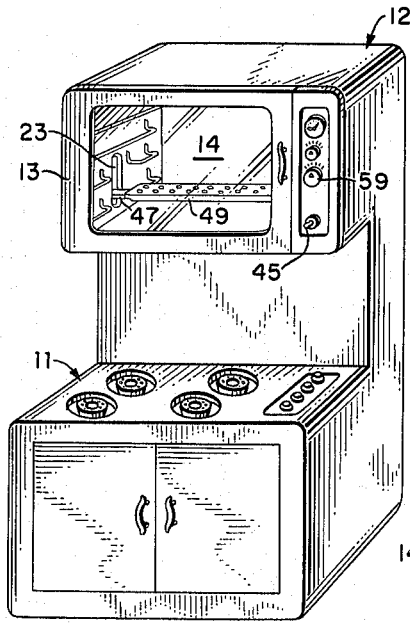
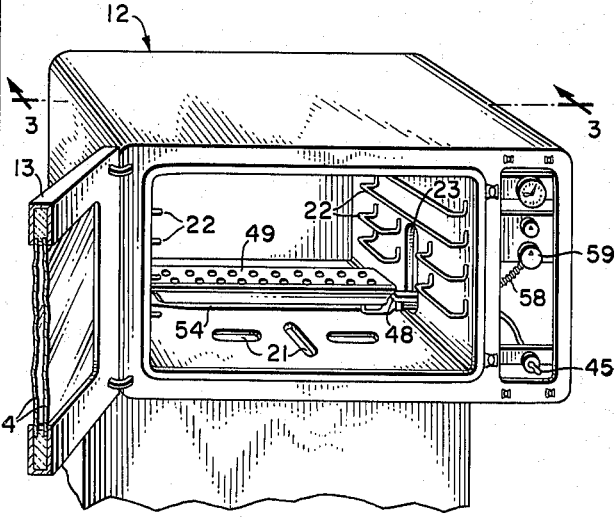
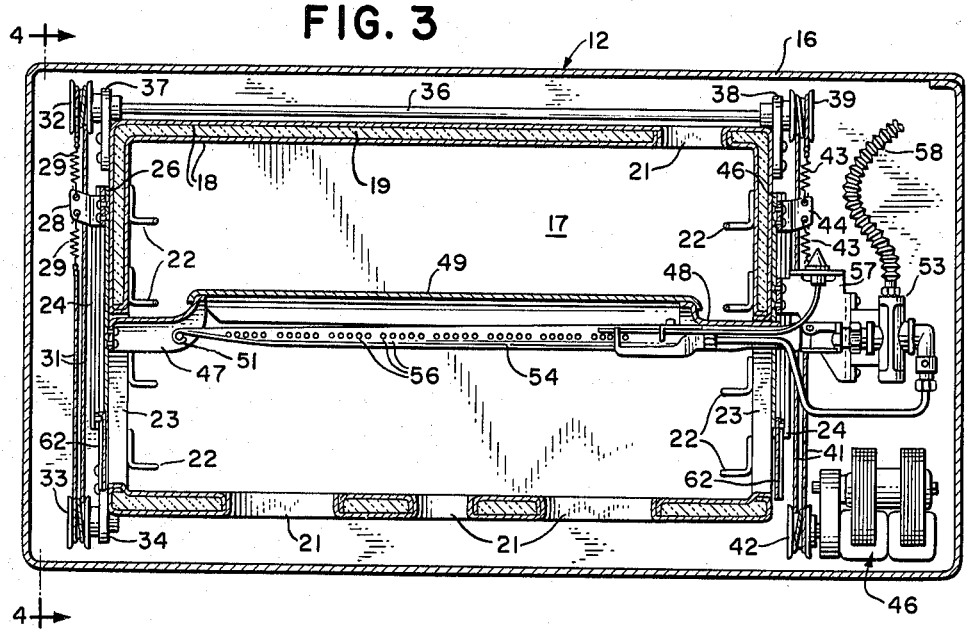
INVENTOR.
DAVID S. HIRSCH
BY
ATTORNEY March 22, 1966 D. S. HIRSCH 3,241,543
BURNER ARRANGEMENT FOR DOMESTIC COOKING OVEN
Filed April 28, 1964 2 Sheets-Sheet 2

INVENTOR.
DAVID S. HIRSCH
BY
M.R. Marsh
ATTORNEY

United States Patent Office 3,241,543
Patented Mar. 22, 1966

3,241,543
BURNER ARRANGEMENT FOR DOMESTIC
COOKING OVEN
David S. Hirsch, Brooklyn, N.Y.
(57—18 Flushing Ave., Maspeth 78, N.Y.)
Filed Apr. 28, 1964, Ser. No. 363,220
2 Claims. (Cl. 126—39)

The present invention relates primarily to domestic cooking enclosures such as ovens and broilers and the like and is particularly adaptable to the so-called eye-level or elevated type of cooking enclosures that are usually positioned above and extend out over a conventional type counter height top burner cooking surface. The elevated or eye-level enclosure permits convenient use and inspection of articles therein.

Most conventional types of domestic cooking stoves are arranged, for reasons of economy and space, with a top horizontal burner or cooking surface below which is located an enclosure divided into separate oven and broiler compartments. Usually the oven compartment is located above the broiler compartment and a single burner supplies heat for both, which with associated baffles and the like divide the enclosure into the two compartments. Thus from the single burner the oven is indirectly heated while food in the broiler compartment is subjected directly to heat from the burner.

Obviously, such a single burner arrangement for an oven-broiler combination requires an enclosure of considerable height, substantially the sum of the heights of the broiler and the oven compartments. To elevate such a single burner oven-broiler combination to substantially eye-level would be impractical since the interiors of two such arranged compartments could not be easily and/or conveniently viewed or inspected, one being too low and the other too high.

In view of the above it is one of the primary objects of the present invention to provide an oven-broiler combination enclosure that is particularly adapted for eye-level installation wherein the height of the burner in the enclosure is adjustable. With this arrangement and with the burner for example near the bottom of the enclosure, substantially the entire enclosure can be used for baking, or depending on the height adjustment of the burner, as much of the enclosure as desired may be used for broiling and the rest for baking.

Another object of the present invention resides in the provision of a combination broiler-oven enclosure with an adjustable height burner wherein the height thereof is controlled from outside the enclosure so that there is no need to open the enclosure door.

In connection with the above, it is a still further object of the invention to provide a broiler-oven enclosure including a height adjustable burner wherein the height adjustment may be made to any one of an infinite number of heights within the limits of adjustments and also during a baking and/or broiling operation.

The above and further objects and features of the present invention will be more apparent in the following detailed description of a preferred embodiment thereof wherein reference is made to the accompanying drawings. It should be kept in mind, however, that while the invention is hereinafter described and shown in the drawing in the manner in which it may be applied to a gas-fired eye-level type of oven enclosure, it is not limited to this particular type but may be applied to various types of cooking enclosures.

In accordance with the teachings of the present invention a cooking enclosure located at eye-level has a gas-fired burner which can be raised and lowered, within certain limits, by an electric motor operated elevating mechanism. The elevating mechanism is entirely independent of the fuel supply to the burner and can operate while the burner is heating the enclosure.

In the drawings,

FIG. 1 is a perspective view of a counter height cooking surface with an eye-level baking-broiler enclosure embodying the present invention associated therewith;

FIG. 2 is an enlarged perspective view showing the interior of the enclosure;

FIG. 3 is an enlarged vertical sectional view of the enclosure taken substantially on line 3—3 of FIG. 2;

Figure 4:
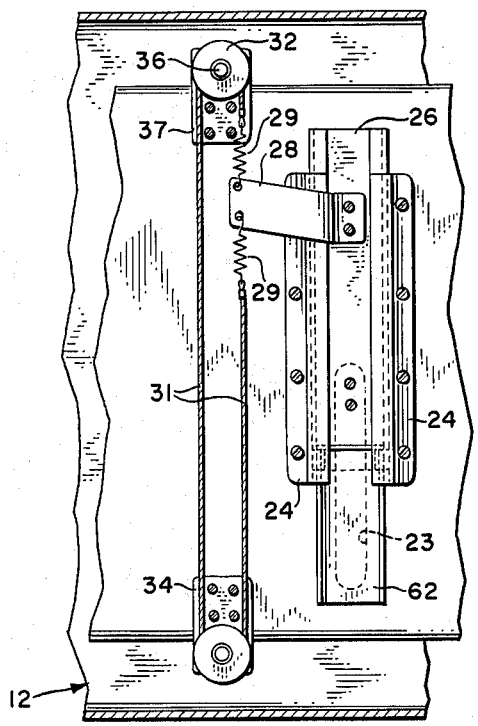
FIG. 4 is a left-hand end view of the burner elevating mechanism.

Referring now to the drawings, FIG. 1 discloses a conventional type counter height top burner cooking surface 11 and located thereabove at substantially eye-level and indicated generally by reference numeral 12 is the cooking and broiling enclosure to which the present invention pertains. The enclosure 12 has a door 13 with glass panels 14 therein whereby the cooking progress of articles within the enclosure can be observed without the necessity of opening the door. The door is hinged at its left-hand edge to swing about a vertical axis. To the left of the door and on the front face of the enclosure are a set of controls which will be more fully described hereinafter.

As best shown in FIGS. 2 and 3, the enclosure 12 has an outer shell 16 of suitable material such as sheet metal and contained therein is the cooking enclosure 17. The enclosure 17 is suitably supported in spaced relation from the shell 16 and comprises a double thickness sheet metal casing 18 with suitable insulation 19 between the two surfaces thereof. The cooking enclosure 17 has in the top and bottom surfaces suitable ventilating openings, such as 21, and extending from the side walls are a series of rack supporting brackets 22. Centrally located in the lower sections of each of the side walls of the enclosure 17 are elongated openings 23.

Attached to the outside of the cooking enclosure and adjacent each of the openings 23 are a pair of vertical angle guide brackets 24. The left-hand guide brackets, as shown in FIG. 4, are arranged to guide a slide 26 for vertical movement. The slide 26 has attached to the outer face thereof a bracket 28. Through springs 29 the free end of the bracket 28 is attached to the ends of a belt or cord 31 which extends up and around a pulley 32 and down and around another pulley 33. The pulley 33 is an idler pulley support from a bracket 34 while pulley 32 is attached to a shaft 36 suitably journaled in a bracket 37. Both brackets 34 and 37 are attached to the outside of the cooking enclosure 17. The shaft 36 extends across the top of the enclosure 17 and its right-hand end is supported in a bracket 38 adjacent a pulley 39. A cord or belt 41 is wound about the pulley 39 and one end thereof extends down and around a drive pulley 42. The ends of the cord or belt 41 are attached through springs 43 to a bracket 44 secured to the outer face of the slide 46 at the right-hand end of the enclosure. The arrangement of the cord 41, springs 43, bracket 44, slide 46 and guides 24 on the right-hand end of the enclosure are similar to those on the left-hand end.

The pulley 42 is fixed to a relatively slow-speed shaft which may be driven through suitable reduction gearing included in the housing of a reversible electric motor 46. Through the described pulleys and cords it will be evident that with the motor rotating in one direction the slides 26 and 46 will be raised and with the motor rotating in the other direction the slides will be lowered. The electrical circuits to the motor may be manually controlled from a switch 45 on the control panel to the right of the door 13. The switch 45 may, for example, have a center-off position and in its up-position control the circuit to cause the motor to raise the slides and in its down position cause the motor to lower the slides. When the slides 26 and 46 are moved to the limits of their movements, as will be obvious hereinafter, the belt 41 is adapted to slip on the pulley 42 which eliminates the necessity of limit switches.

Figure 6:
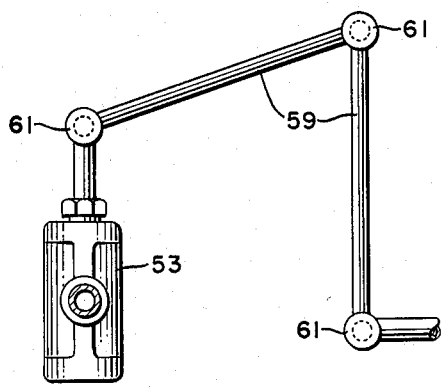
FIG. 6 is an end view of a modified arrangement for supplying gas to the burner.

Secured to the inner opposite faces of each of the slides 26 and 46 and extending through respective openings 23 are brackets 47 and 48 which support at the free inner ends thereof a baffle member 49. Mounted at its left-hand end on a pin 51 in bracket 47 with the venturi end extending through an opening 52 in slide 46 to a gas-control valve 53 is a burner 54. The burner 54 has a series of gas ports 56 along the side thereof through which the gas passes prior to burning. The gas-controlled valve 53 is preferably of the conventional solenoid type and has associated therewith the usual type of temperature regulating means and may include a pilot light. The valve is suitably supported from an angle bracket 57 in turn attached to the outer face of the slide 46 so as to move up and down with the slide. The valve in the preferred embodiment of the invention is supplied with gas through a flexible pipe or tubing 58. In conjunction with the gas valve 53 a manual settable temperature control 59 on the control panel is employed to regulate the temperature of the enclosure. As shown in FIG. 6, the valve 53 may be supplied with gas from the fixed gas supply means through a set of rigid pipe or tube sections 59 and swing joints 61.

Figure 5:
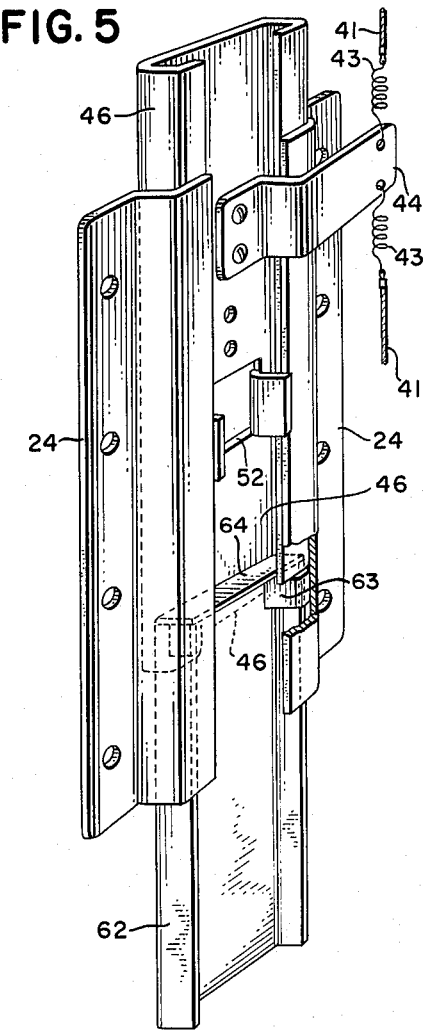
FIG. 5 is a perspective view of right-hand guide of the burner elevating mechanism.

To eliminate the necessity of providing rather elongated slides 26 and 46 to keep the openings 23 covered for all positions of the slides, they are provided with slide inserts 62. These inserts are arranged to telescope within their respective slide within certain limits as the slides move in a downward direction and the lower ends of the inserts are engaged with the casing 12 or other parts of the enclosure. As the slides 26 and 46 move upward from their lowermost positions to some intermediate point, turned-in tabs 63, FIG. 5, on the lower ends of the slides engage horizontal sections 64 at the upper end of the inserts so that on further upward movement of the slide the insert will rise therewith. Thus the side openings 23 of the enclosure are covered for all positions of the burner.

From the above-described arrangement, it will be apparent that the present invention provides a cooking enclosure with an adjustable height burner that can be conveniently raised or lowered during a cooking operation and wherein substantially the entire enclosure can be used for baking or as much of the enclosure as desired, within limits, for broiling.

While various modifications of the invention will occur to those versed in the art, it is desired that only such limitations be placed therein as are imposed by the appended claims.

What is claimed is:

1. In an oven cooking enclosure, a horizontal heat supplying means extending substantially the full width of said enclosure, a heat distributing baffle associated with and above said heat supplying means, said heat supplying means and said baffle dividing said enclosure into baking and broiling areas respectively above and below said heat supplying means and said baffle, an elongated vertical opening at each end of said enclosure, slides adjacent said openings and guided for vertical movement, support means associated with said slides for supporting said heat supplying means and said baffle and extending through said openings, a flexible belt associated with each of said slides and having the ends thereof attached thereto, a pair of vertically spaced apart pulleys for each belt, an electric motor for rotating in either direction one of the pulleys of one pair with the other pulley of said pair directly coupled to a pulley of the other pair, and means including said belt, pulleys and electric motor for raising and lowering said slides and the supported heat supplying means and baffle to vary the portions of said enclosure adapted for baking and broiling.

2. In a domestic cooking enclosure, a horizontally disposed burner extending substantially the full width of said enclosure, elongated vertical openings at either end of said enclosure, supports at either end of said enclosure for said burner extending through said openings to the exterior of said enclosure, guides for guiding said supports in vertical movement, a shaft exterior of said enclosure extending from one end thereof to the other, pulleys secured to the ends of said shaft, an electric motor driven pulley in vertical alignment with one of said first-mentioned pulleys and an idler pulley in vertical alignment with the other of said first-mentioned pulleys, a flexible belt member for each of said vertically aligned pairs of pulleys with the ends thereof secured to said supports whereby operation of said motor in opposite directions elevates and lowers said burner within said enclosure, a source of energy for said burner, and means for supplying said energy from said source to said burner for all positions thereof and during the elevating and lowering thereof.

References Cited by the Examiner

UNITED STATES PATENTS

| | | | |
|---|---|---|---|
| 1,697,357 | 1/1929 | Houlis | 126—39 X |
| 2,218,961 | 10/1940 | Schulz | 126—39 |
| 2,841,684 | 7/1958 | Miskella | 219—404 X |
| 2,856,502 | 10/1958 | Wolf. | |

FOREIGN PATENTS 173,314 12/1921 Great Britain.

JAMES W. WESTHAVER, *Primary Examiner.*

CHARLES J. MYHRE, *Examiner.*